UNITED STATES PATENT OFFICE.

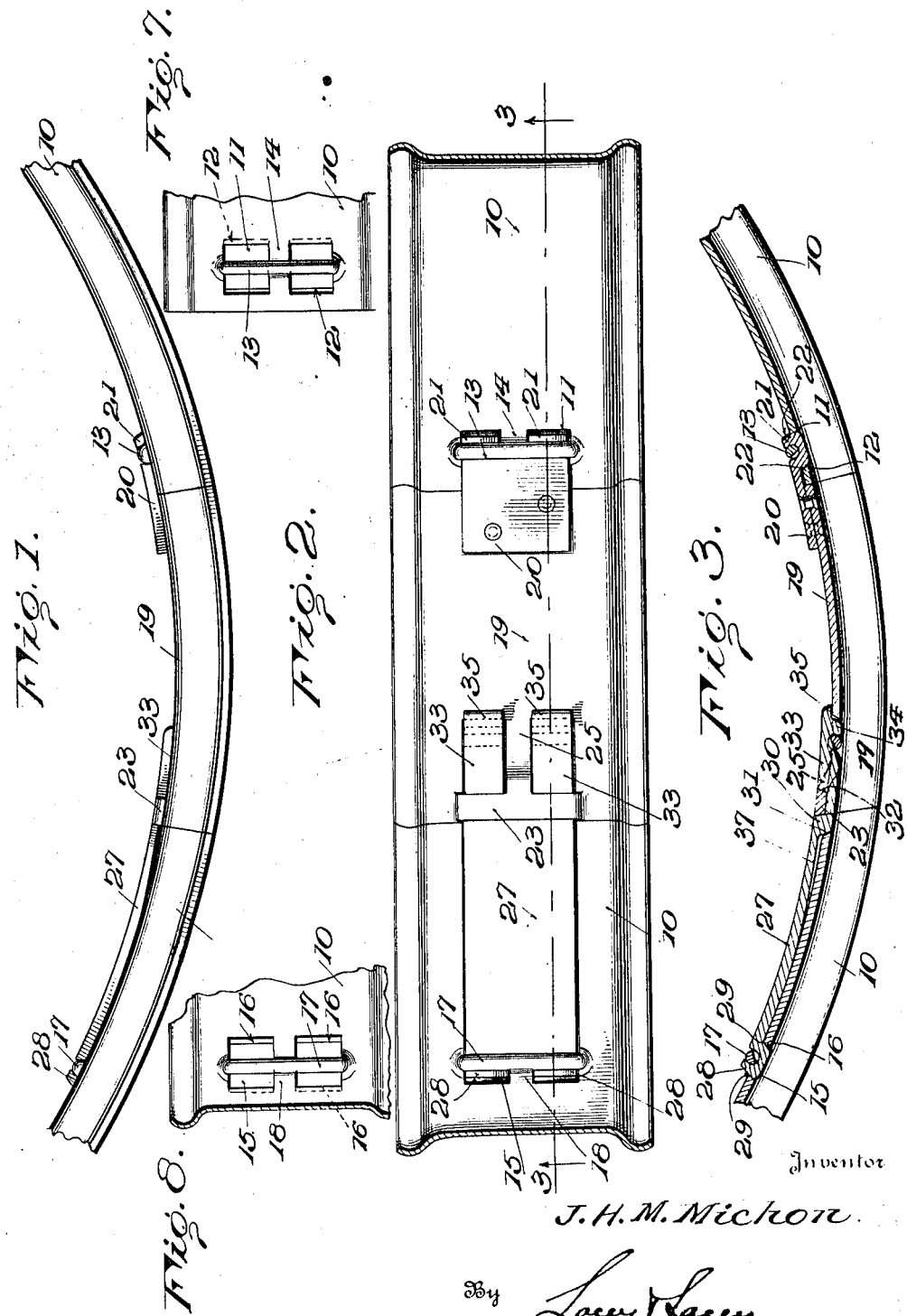

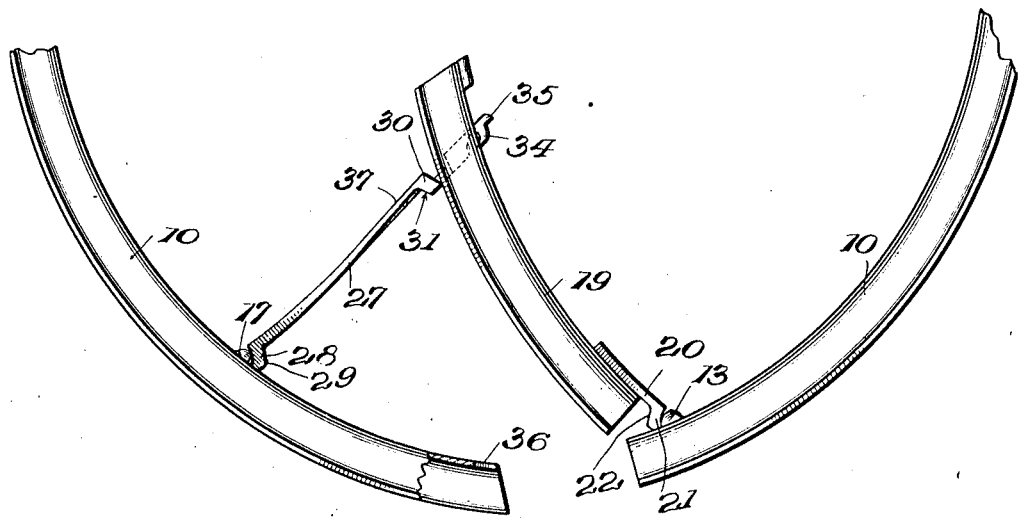
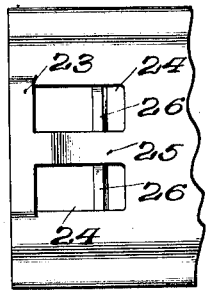
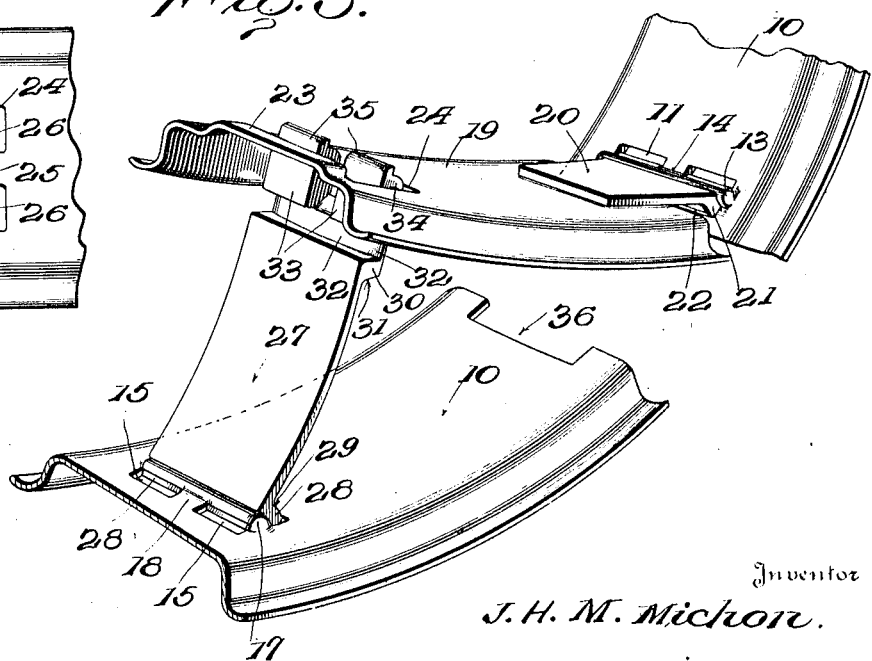

JOSEPH H. M. MICHON, OF WASHINGTON, DISTRICT OF COLUMBIA.

COLLAPSIBLE WHEEL-RIM.

1,314,415.  Specification of Letters Patent.  Patented Aug. 26, 1919.

Application filed January 24, 1918. Serial No. 213,574.

*To all whom it may concern:*

Be it known that I, JOSEPH H. M. MICHON, a subject of the King of Great Britain, residing at Washington, District of Columbia, have invented certain new and useful Improvements in Collapsible Wheel-Rims, of which the following is a specification.

This invention relates to an improved collapsible wheel rim and has as its primary object to provide a rim which, when expanded, will constitute a thoroughly rigid and solid structure for efficiently supporting a tire so that the rim may, as desired, be used either upon pleasure vehicles or upon trucks and wherein the said rim may be collapsed with a minimum of difficulty.

The invention has as a further object to provide a rim of the above character employing a hinged rim section and a link plate coacting with the said rim section to provide a toggle operable for expanding the body of the rim and shifting the rim section to active position and wherein the said rim section and link plate will be so formed that, when the rim section is disposed in active position, all stress upon the rim section and link plate will be diverted from the pivot bars and lugs connecting such elements.

The invention has as a further object to provide a construction wherein the hinged rim section will be effectually limited in its movement to active position and wherein the free extremity of the said rim section will be rigidly locked against transverse movement with respect to the rim body.

And the invention has as a still further object to provide an arrangement wherein the rim section and link plate will be normally locked against displacement from the rim body as well as from each other but wherein the said rim section and link plate may be readily swung to a position for free disengagement from each other and detached without the use of any special tools.

Other and incidental objects will appear as the description proceeds and in the drawings, wherein I have illustrated the preferred embodiment of the invention, and wherein similar reference characters designate like parts throughout the several views:

Figure 1 is a fragmentary side elevation showing a portion of my improved rim and illustrating the hinged rim section in active position between the ends of the rim body, Fig. 2 is a fragmentary plan view showing the inner side of the rim at the hinged rim section, Fig. 3 is a sectional view taken on the line 3—3 of Fig. 2 and looking in the direction of the arrows, this view particularly illustrating the manner in which the hinged rim section and link plate employed are formed for diverting the strain from the pivot bars of such elements.

Fig. 4 is a fragmentary side elevation showing the hinged rim section swung to inactive position, Fig. 5 is a fragmentary perspective view particularly showing the link plate, Fig. 6 is a fragmentary plan view of the free extremity of the rim section showing the pivot bars carried thereby to coact with the link plate, Fig. 7 is a fragmentary plan view of one extremity of the rim body showing the pivot bar carried thereby, and Fig. 8 is a fragmentary plan view of the opposite extremity of the rim body, showing the pivot bar carried thereby.

In carrying out the invention I employ a split resilient rim body 10 which may be of any approved general design for receiving a pneumatic tire. Adjacent one end of the rim body, the bottom wall thereof is formed with a transversely extending opening 11, the forward and rear edges of which are formed with beveled shoulders 12. Extending medially of the said opening and transversely of the rim body is an inwardly offset pivot bar 13 overlying and connected with a bracing web 14 extending transversely of the opening. Formed in the bottom wall of the rim body adjacent its opposite extremity is a similar opening 15, the forward and rear edges of which are formed with beveled shoulders 16. Extending longitudinally of the opening 15 and transversely with respect to the rim body is an inwardly offset pivot bar 17 corresponding to the pivot bar 13 and overlying a transverse bracing web 18 to which it is secured.

Coöperating with the rim body is a rim section 19 upon the inner side of which is integrally formed or otherwise secured a hinge plate 20 projecting at one end of the rim section. This hinge plate is provided at its outer extremity with spaced arcuate hinge lugs 21 which are received within the opening 11 of the rim body and embrace the pivot bar 13 at opposite sides of the bracing web 14 for swingingly connecting the rim section with the rim body. As particularly shown in Fig. 3 of the drawings, the forward and rear sides of the hinge lugs 21 are formed with beveled shoulders 22 to confront the beveled shoulders 12 of the opening 11. The purpose of this arrangement will presently appear. Struck from the bottom wall of the hinged rim section at its free extremity is, as particularly shown in Fig. 6, an inwardly offset transverse locking web or strip 23 in the rear of which the said wall of the rim section is formed with spaced longitudinal openings 24, defining an intermediate bracing web 25 extending from the central portion of the locking strip. This bracing web is, adjacent its outer extremity, inwardly offset to lie flush with the said locking strip and extending from the said bracing web across the openings 24 adjacent the inner extremities thereof are alined pivot bars 26 disposed flush with the bottom wall of the rim section.

Extending between the free extremity of the hinged rim section and the adjacent extremity of the rim body is a link plate 27 which is longitudinally curved to seat flat against the inner side of the rim body. At one extremity this link plate is formed with spaced laterally directed hinge lugs 28 which are received within the opening 15 of the rim body and embrace the pivot bar 17 at opposite sides of the bracing web 18 for swingingly connecting the link plate with the rim body. As particularly shown in Fig. 3, the hinge lugs 28 are formed upon the forward and rear sides thereof with beveled shoulders 29 to confront the beveled shoulder 16 of the said opening. The purpose of this arrangement will also presently appear. At its extremity opposite the lugs 28, the link plate is formed with a thickened head 30 which extends laterally at one side face of the said plate and at its inner extremity is provided with a beveled transverse shoulder 31. Immediately in advance of said shoulder, the said head is further formed with a transverse channel or socket 32 opening through the outer side face of the head and, as particularly shown in Fig. 3, provided with inwardly beveled side walls. Formed from the head at its outer extremity, are spaced hinge members 33 which are received within the openings 24 of the hinged rim section and are cut away upon the inner sides thereof to provide hinge lugs 34 embracing the pivot bar 26 at opposite sides of the bracing web 25 for thus swingingly connecting the free extremity of the rim section to the adjacent extremity of the rim body. From the hinge lugs 34 the hinge members 33 are extended to provide stop lugs 35.

As will now be seen by particular reference to Figs. 4 and 5 of the drawings, the hinge plate 27 will coöperate with the hinged rim section to provide a toggle so that when the parts are in the position shown in these figures, outward pressure may be exerted against the inner terminal of the hinged rim section for spreading the extremities of the body of the rim and shifting the said rim section to active position, as shown in Figs. 1, 2 and 3, fitting between the ends of the rim body. The annular contour of the rim will thus be completed by the hinged rim section and it is now to be observed that when the rim section is so swung to active position, the link plate will be moved to lie flat against the inner side of the rim body while the head 30 of the said plate will be shifted to fit within a suitable notch 36 formed in the bottom wall of the rim body at the adjacent end thereof and will consequently lock the free extremity of the rim section against transverse movement with respect to the rim body. At the same time the stop lugs 35 of the hinge members 33 will be moved to engage the inner side face of the hinged rim section at the inner ends of the openings 24 while the locking strip 23 will be shifted to simultaneously engage within the channel 32 of the link plate and thus limit the hinge rim section in its outward swinging movement. As particularly shown in Fig. 3, the locking strip 23 is formed with beveled side edges to coact with the beveled side walls of the channel 32 of the link plate so that the said locking strip will wedge within the said channel and, in being arranged to overlie the free extremity of the link plate, will consequently tend to lock the said plate and, therefore, the free extremity of the hinged rim section against inward displacement. However, in order that the plate may be swung inwardly to displace the hinged rim section for collapsing the rim, the said plate is cut away upon opposite sides thereof in the rear of the head 30, as shown at 37, so that a screw driver or other suitable tool may be easily inserted beneath the free extremity of the plate for prying the said plate inwardly and consequently springing the hinged rim section from between the ends of the rim body to the position shown in Figs. 4 and 5 of the drawings. In such position of the hinge rim section a tire may, of course, be readily placed upon or removed from the rim and as will be observed in this connection, the necessity for the use of any special tool in collapsing the rim does not arise.

The inner edge of the notch 36 is formed to provide a beveled shoulder adapted, when the hinged rim section is swung to active position, to coöperate with the shoulder 31 of the head 30 of the link plate, which latter shoulder will bind against the shoulder of the notch. Also, it will be noted that when the hinged rim section is swung to active position, the shoulders 22 of the hinge lugs 21 will bind against the shoulders 12 of the rim body and in like manner the shoulders 29 of the hinge lugs 28 of the link plate will bind against the shoulders 16 of the rim body. Such binding action between these several shoulders as well as the binding action between the locking strip 23 and the side walls of the channel 32, will act to eliminate any looseness between the parts so that chattering or rattling will not occur, while at the same time, such wedging action will result in diverting all strain from the pivot bars 13, 20 and 26 directly to and through the hinged rim section and consequently relieve said pivot bars of all tension. Therefore, in the practical use of the rim shocks or strains occurring at the hinged rim section or other points upon the rim will not be communicated to the said pivot lugs to possibly break the said lugs. The efficiency and durability of the structure is accordingly insured.

Attention is now directed to the fact that the pivot bars 13, 17 and 26 are each formed with a flat face. These flat faces are so arranged that in the normal manipulation of the hinged rim section and link plate the said section and plate will not become detached. However, when the rim is collapsed, the rim body may be compressed sufficiently to swing the hinged rim section to such position that the ends of the hinge lugs 34 of the link plate will be brought opposite the flat faces of the pivot bars 26. The link plate may then, as will be well understood, be readily detached from the hinged rim section, when by swinging the said plate and rim section to bring the ends of the hinge lugs 21 and 28 thereof opposite the flat faces of the pivot bars 13 and 17, the said plate and rim section may be detached from the rim body. Consequently, should any of the parts become broken, in the practical use of the rim, or the efficiency of such parts become otherwise impaired, the defective part may be replaced with facility and without the use of any special tools.

It will, therefore, be seen that I provide a particularly efficient collapsible rim construction and a rim which may be employed in connection with substantially any conventional type of motor vehicle wheel adapted to receive a demountable rim. Consequently, the rim may be readily employed not only upon pleasure vehicles but will be possessed of such rigidity as to also be particularly adapted for use upon motor trucks.

Having thus described the invention, what is claimed as new is:

1. A device of the character described including a split rim body, a rim section pivoted adjacent one end to one end portion of the rim body, means swingingly connecting the opposite end portion of the rim section with the other end portion of the rim body and adapted to coöperate with the rim section for spreading the extremities of the body of the rim and shifting the rim section to active position fitting between the ends of the rim body, and means projecting from the free end of said first mentioned means and adapted to engage the inner side face of the rim section for limiting the said section in its movement to active position.

2. A device of the character described including a split rim body, a rim section pivoted adjacent one end to one end portion of the rim body, a link plate swingingly connecting the opposite end portion of the rim section with the other end portion of the rim body and adapted to coöperate with the rim section for spreading the extremities of the body of the rim and shifting the rim section to active position fitting between the ends of the rim body, and a stop lug projecting from the free extremity of the link plate and adapted to engage the inner side of the rim section for limiting the said section in its movement to active position.

3. A device of the character described including a split rim body, a rim section pivoted adjacent one end to one end portion of the rim body, a link plate swingingly connecting the opposite end portion of the rim section with the other end portion of the rim body and adapted to coöperate with the rim section for spreading the extremities of the body of the rim and shifting the rim section to active position fitting between the ends of the rim body, the link plate being formed with a socket having inwardly beveled walls, and a locking strip carried by the rim section and adapted to extend over the free extremity of the link plate within said socket, the said locking strip being formed with beveled edges to bind against the beveled walls of the socket for locking the free extremity of the link plate against accidental inward displacement.

4. A device of the character described including a split rim body, a rim section pivoted adjacent one end to one end portion of the rim body, a link plate swingingly connecting the opposite end portion of the rim section with the other end portion of the rim body and adapted to coöperate with the rim section for spreading the extremities of the body of the rim and shifting the rim section to active position fitting between the ends of the rim body, the said link plate being formed with hinge lugs engaging the rim section, and a locking strip carried by the rim section to engage over the free extremity of the link plate in the active position of the rim section wedging against said lugs for locking the rim section against accidental inward displacement.

5. A device of the character described including a split rim body, a rim section pivoted adjacent one end to one end portion of the rim body, the free end portion of said section being formed with spaced openings, pivot bars extending across said openings, and a link plate swingingly connecting the free end portion of the rim section with the other end portion of the rim body and provided with spaced hinge members having hinge lugs formed therefrom and engaging said pivot bars, the link plate being adapted to coöperate with the rim section for spreading the extremities of the body of the rim and shifting the rim section to active position fitting between the ends of the rim body.

6. A device of the character described including a split rim body, a rim section pivoted adjacent one end to one end portion of the rim body, a link plate swingingly connecting the opposite end portion of the rim section with the other end portion of the rim body and adapted to coöperate with the rim section for spreading the extremities of the body of the rim and shifting the rim section to active position fitting between the ends of the rim body, a hinge member carried by the link plate and engaging the rim section, a locking strip carried by the rim section, and a stop lug carried by the hinge member, the locking strip being movable to engage over the free end portion of the link plate and the stop plug being movable to engage the inner side face of the rim section in the active position of the rim section for limiting the rim section in its movement to active position and locking the said section against accidental inward displacement.

In testimony whereof I affix my signature.

JOSEPH H. M. MICHON. [L. S.]